United States Patent Office 3,387,812
Patented June 11, 1968

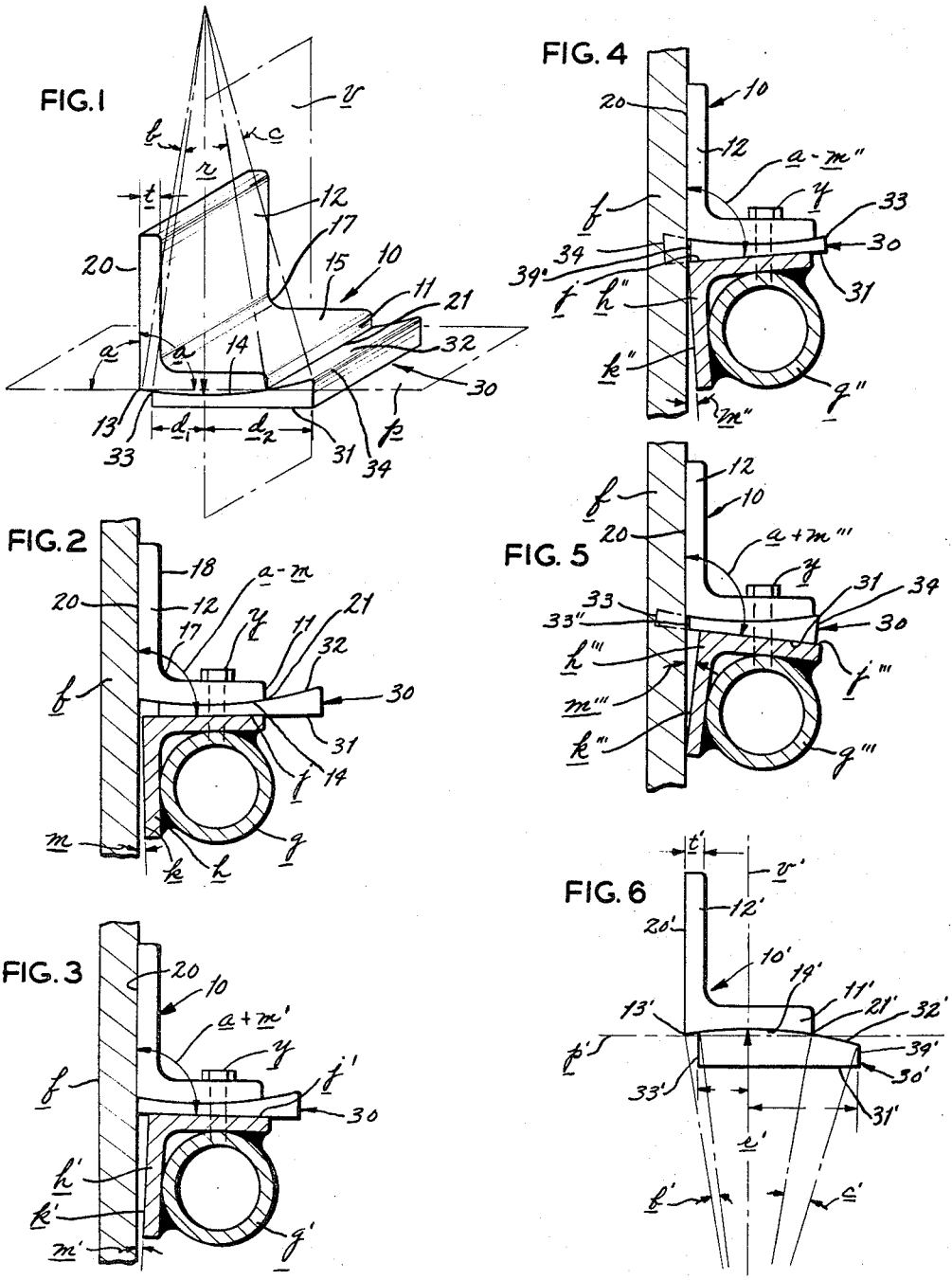

3,387,812
BRACKET AND REVERSIBLE BASE MEMBER ASSEMBLY FOR FIXTURE CONSTRUCTION
Jule Wayne Thoms, Florissant, Mo., assignor to Carr Lane Manufacturing Company, St. Louis, Mo., a corporation
Filed Oct. 19, 1966, Ser. No. 587,813
4 Claims. (Cl. 248—274)

ABSTRACT OF THE DISCLOSURE

An angle bracket and base member assembly are useful for taking up angular misalignment of welded manufacturing fixtures. The bottom arcuate flange of the angle bracket seats upon the upper, complementary arcuate surface of the base member, which is low along one edge. When this edge is positioned adjacent to a part to be supported, the resulting clearance permits take-up of some angular misalignment tolerance merely by positioning relatively sideward. For greater misalignment, the base member is reversed so that its higher edge is adjacent to the work; and any interfering material along this edge is trimmed off.

---

The present invention deals with adjustable support brackets for factory assembly fixtures and the like, and particularly to support brackets which are adjustable angularly.

Fixtures used for supporting aircraft sub-assemblies during fabrication, and similar uses, are customarily fabricated by welding tubular support structures and welding on attachment angles, to provide work supporting points. Because of inaccuracies inherent in such fabrication, it is not possible to provide such support points in the precise planar alignment desired. Even a fixture structure which has been well fabricated, substantially without error, is likely to have such support points misaligned say 1° or 2° out of the desired planarity; whereas in many instances the completed fixture structure, too valuable to be scrapped or re-worked, will be found to have its support points a substantially greater extent out of desired alignment.

The principal purpose of the present invention is to provide an angularly alignable support bracket for affixment to such a well-fabricated fixture structure, which may be finally set in precisely the desired planar alignment, without altering the bracket in any way. A further purpose is to provide for equally precise alignment of fixture structures which are badly fabricated. Still further purposes are to provide a standard stock adjustable support bracket which permits a substantial angular variation to either side of a normal position; and to utilize a smaller base member than has heretofore been thought possible for the range of positions achieved.

Generally summarized, the present invention consists of the assembly of a novel base member and rigid angular bracket having a support point attachment flange, the bracket's bottom flange having a constant radius convex arcuate bottom surface. This is set upon the complementary concave seat surface of a base member, to be drilled and secured to hold the attachment flange at the exact desired angularity. Adjustably positioning the bracket member on the base member affords a substantial degree of variation from a normal standard angle which the attachment flange makes with the base surface of the base member.

Uniquely, the base member is unsymmetrical; its parallel side edges are spaced at unequal distances from a plane perpendicular to that of its base surface and to the arc, so that one of these edges is substantially lower than the other. The arc length to the nearer edge is less than half the arcuate length of the bottom flange of the bracket; hence when used on very accurately fabricated fixtures, such nearer base edge is positioned near the attachment flange of the angle bracket, giving a range of adjustment of 1° or more to either side of normal without objectionable protruding of the base or loss of rigidity of attachment. However, for badly misaligned fixtures where a larger angular correction is necessary, the position of the base member is either shifted substantially, or is completely reversed so that its edge farther from such perpendicular plane will be positioned near to the attachment flange of the angle bracket. On such shifting or reversal of position, excess length of the base member may project into the region of a contour board or other article to be supported by the fixture; this excess must be trimmed off. Such trimming operation is simple and inexpensive, compared to the saving of cost of re-working a fixture.

In the preferred embodiment of the invention illustrated in the drawings:

FIG. 1 is a perspective view of an assembly including an angle bracket whose bottom surface is convex, seated on a reversible base member whose seat surface is concave, in position to form a normal angle $a$.

FIG. 2 is a schematic view of the bracket and reversible base member assembly mounted onto a welded angle-and-tube fixture, shown re-positioned to form a slightly smaller angle $a-m$, thereby to compensate for a small angular misalignmnet of a welded fixture shown in action.

FIG. 3 is a view generally similar to FIG. 2 showing re-positioning to form a slightly larger angle $a+m'$, compensating for a small angular misalignment in the opposite sense.

FIG. 4 is a generally similar view showing the base member reversed and cut off and the parts re-positioned to form a substantially smaller angle $a-m''$, compensating for a substantial misalignment.

FIG. 5 is a view generally similar to FIG. 3 showing the base member moved farther to the left than in FIG. 3 and cut off and the parts re-positioned to form a substantially greater angle $a+m'''$.

FIG. 6 is a view of an alternative embodiment including an angle bracket whose bottom surface is concave seated in a similarly reversible base member whose seat surface is convex.

Referring to FIG. 1 the present assembly includes a unique angle bracket generally designated 10 and a reversible base member generally designated 30. The angle bracket 10 is quite rigid, considering the conditions of use as is customary in the art of fixture making; it has two thick flanges, a bottom flange 11 and an attachment flange 12, whose angularly-outer surfaces meet at a juncture edge 13. The outer surface of the bottom flange 11 is a convex arcuate bottom surface 14, of constant radius $r$. Considering the arc of the surface 14, the juncture edge 13 is perpendicular thereto. The bottom flange 11 has a planar upper top surface 15 for drilling through and bolting as shown in FIGS. 2–5 inclusive in a conventional manner.

A generous radius 17 at the inner side of the angle bracket 10 between the bottom and attachment flanges 11, 12 leads from the planar upper surface 15 to the angularly-inner surface 18 of the attachment flange 12. The outer face 20 of the attachment flange 12 is machined to define a plane which includes the juncture edge 13. Opposite to it, at the other side of the bottom surface 14 is an opposite parallel bottom flange edge 21. Taking a plane $p$ through these—the juncture edge 13 and opposite parallel edge 21—as a plane of reference, the outer face 20 defines a normal standard angle $a$ thereto. In both the embodiments shown this normal standard angle is 90°; if desired the normal standard angle might be made some other convenient angle for fixture manufacture.

The base member 30 has a flat machined base surface 31 and thereabove a concave arcuate seat surface 32, whose constant radius $r$ is that of the convex arcuate bottom surface 14 of the angle bracket 10. Considering a plane $v$ perpendicular to that of the base surface 31 and also perpendicular to the sweep of said arc whose radius is $r$, the base member 30 terminates in a nearer parallel edge 33 and a farther parallel edge 34, at unequal distances $d_1$, $d_2$ respectively from said plane $v$ specifically. The arc length of that part of the seat surface 32 from the perpendicular plane $v$ to the nearer edge 33 is less by at least 1° than half of the arcuate length of the convex arcuate bottom surface 14 of the bracket bottom flange 11; the difference is shown in FIG. 1 as the small angle $b$. In contrast, the arc length of that part of the seat surface 32 from the perpendicular plane $v$ to the farther edge 34 is greater than half the arcuate length of the bottom surface 14; the excess is shown in FIG. 1 as the angle $c$.

In the embodiment shown in FIGS. 1–5 the thickness of the attachment flange 12 is designated $t$. I have found that when made to thicknesses $t$ and other proportions conventional for angles for fixture manufacture, the present assembly will have suitable rigidity even if the juncture edge 13 overhangs the base member 30 by an amount not greater than the attachment flange thickness $t$. Taking advantage of this fact, the lesser arc length of that part of the seat surface 32 from the perpendicular plane $v$ to the nearer edge 33 is, in the present invention, designed to be shorter than half the arcuate length of the bottom surface 14 by the angle $b$. This angle falls within the range of from 1° to that angle whose sine equals the thickness $t$ of the attachment flange 12 divided by the radius $r$. Preferably the amount of overhang of the juncture edge 13 over the base member 30, when the angle bracket 10 is positioned on the base member at the normal angle $a$, is approximately $t/2$. This permits precise adjustment to a greater or lesser angle than the normal angle $a$, to compensate for small manufacturing deviations. For larger deviations, the excess of arc length $c$ adjacent to the farther edge 34 of the seat surface 32 is employed. This excess arc length $c$ is at least as great as the same angle whose sine equals the thickness of the attachment flange $t$ divided by the radius $r$.

A typical use of the present invention is to set a contour board $f$ in a precise vertical plane, utilizing a welded manufacturing fixture including a round tube $g$ and an angle $h$ welded thereon so that its upper flange surface $j$ is almost but not quite horizontal and its outer flange surface $k$ is almost but not quite vertical. Corresponding angle and bracket assemblies are illustrated in each of the conditions of deviation shown schematically in FIGS. 2–5 inclusive. Such deviations to both sides of vertical, and to a lesser or greater angular extent, are routinely encountered in making fixtures by welding; they arise from warpage accompanying welding, misalignment, an accumulation of tolerances, occasional poor workmanship, and other normally-encountered causes.

FIG. 2 illustrates the condition wherein the outer flange surface $k$ departs from the vertical in one direction by a small angle $m$. This calls for setting the outer face 20 of the attachment flange 12 at an angle to the base member's bottom surface 31 which is less than the standard angle $a$ by the small angle $m$. As long as the angle $m$ is fairly small this setting can be accomplished by positioning the reversible base member 30 to the right along the upper flange $j$ of the angle $h$ so that the attachment flange 12 overhangs the nearer edge 33 by a greater extent; but for adequate rigidity, this overhang should not exceed the thickness $t$. When the arcuate bottom surface 14 is so positioned along the complementary arcuate seat surface 32 that its outer face 20 is precisely vertical, the bracket assembly may be secured to the fixture structure. Typical securement is by drilling through the angle bracket 10, base member 30, angle $h$ and tube $g$, drilling and tapping the fixture tube $g$ and angle $h$, and fastening with a machine screw $y$. The contour board $f$ may then be affixed in precisely vertical alignment to the outer face 20 of the angle 12.

FIG. 3 illustrates a condition of fixture deviation opposite in direction to that of FIG. 2, but through a similarly small angle $m'$. The welded fixture illustrated is made up of a round tube $g'$ and welded on angle $h'$ whose outer flange surface $k'$ departs from the vertical by such small angle $m'$. To set the attachment flange outer face 20 precisely vertical, it must form an angle to the base member's bottom surface 31 which is greater than the standard angle $a$ by the small angle $m'$, that is, $a+m$. This is accomplished by positioning the base member 30 to the left along the upper flange $j'$ of the angle $h'$. The full extent of the design overhang of the juncture edge 13 over the base member 30 is available for this purpose, normally ½ sin $t/r$. For greater angular deviation, the FIG. 5 situation is applicable.

FIGS. 4 and 5 illustrate severe angular misalignment of the welded angles $h''$, $h'''$ on the fixture tubes $g''$, $g'''$ respectively. Instead of expensive operations to salvage the welded fixtures, the present angle and bracket assembly may be utilized to establish a precise vertical position for the contour board $f$, merely by properly trimming and positioning the reversible base member 30 as shown.

FIG. 4 shows an excessive angular deviation in the same direction as that shown in FIG. 2, by a greater angle $m''$. The attachment flange 12 must be set at an angle $a-m''$ to the base member's bottom surface 31. This cannot be compensated for in the same manner as the condition illustrated in FIG. 2; if the base member 30 were far to the right, the attachment flange 12 would overhang the base member 30 too far and thus lose the rigidity of the assembly. Instead, I reverse the base member 30 so that its edge 34 is adjacent to the angle's juncture edge 13. The edge 34, being formed farther from the vertical plane $v$ than the opposed edge 33, is thicker; and the slope of the arcuate seat surface 32 adjacent to it is greater. I position it on the upper flange surface $j''$ as far to the left as is required to set the outer attachment face 20 of the angle bracket 10 in precisely vertical position permitting it to jut out beyond the outer flange surface $k''$. Upon determining how much interference this will cause with the contour board, I then trim the base member's edge 34 back as far as necessary, to a new non-interfering edge 34''. The parts are then re-assembled and secured in the same manner as has been described for the FIG. 2 condition.

In the FIG. 5 illustration, an excess angle of deviation $m'''$ is present, in the same direction as the angle $m'$ shown in FIG. 3 but to a substantially greater extent. Such deviation of the angle $h'''$ welded onto the tube $g'''$ is shown by the departure of its outer flange surface $k'''$ from the vertical by the large angle $m'''$. The attachment flange 20 is thus to be set at a relatively large angle $a+m'''$ to the base member's bottom surface 31. This is accomplished by sliding the base member 30 along the fixture's upper flange surface $j'''$ an amount to the left farther than for the small angular correction required in FIG. 3. When the attachment face 20 is positioned vertically above the outermost portion of the slanting outer flange surface $k'''$, it will be found that much or all of the seat surface 32 near the base edge 34 will be utilized. The amount of correction possible is therefore a function of the angle shown in FIG. 1, at least arc sin $t/r$. Much further movement would leave the bracket angle 10 with less than rigid base support.

Interference with the position to be occupied by the contour board $f$ requires a trimming operation on the base member nearer edge 33. The projection of the base member 30 beyond the outer face 20 of the attachment flange 12 is therefore trimmed off to form a new non-interfering edge 33". The parts may then be secured in precise alignment and the contour board f attached.

Thus, where the fixture structure is reasonably well fabricated, with only the small angular deviations m, m' shown in FIGS. 2 and 3, the contour board may be finally set in precisely the desired planar alignment, without altering any part of the present bracket assembly. The greater deviations m", m'" shown in FIGS. 4 and 5, though resulting from faulty fabrication, are remedied with the same standard stock bracket assembly by a single trim or cut-off operation. The relatively small base member 30 is longer than the angle's bottom flange 11 by only the angular amount c−b at the radius r, yet it accommodates the wide range of angular variation presented by the varying conditions illustrated in FIGS. 2, 3, 4 and 5.

The modified embodiment of the present invention as shown in FIG. 6, is generally similar to the embodiment heretofore described save that the curvatures of the corresponding angle bracket 10' and base member 30' are reversed. Specifically, the rigid angle bracket 10' has the bottom flange 11' and attachment flange 12'. An outer juncture edge 13' marks the juncture of the concave arcuate bottom surface 14', whose constant radius is r', with the outer attachment face 20' of the attachment flange 12'. Opposite to the juncture edge 13' and parallel thereto and demarking the end of the concave arcuate bottom surface 14' is an opposite parallel bottom flange edge 21'. Taking a plane p' through the juncture edge 13' and opposite parallel edge 21' as the plane of reference, the outer face 20' defines a normal standard angle thereto, shown at 90°.

The correspondingly modified base member, generally designated 30', has a flat machined base surface 31' and a convex arcuate seat surface 32' whose constant radius r' is the same as that of the concave bottom surface 14' of the angle bracket 10'. Considering a plane v' perpendicular to that of the base surface 31' and perpendicular to the sweep of the arc whose radius is r', the base member 30' terminates in a nearer base edge 33' and a farther base edge 34' parallel thereto at unequal distances $d_1'$ and $d_2'$ respectively from said plane v'. The arc length of that part of the seat surface 32' from the perpendicular plane v' to the nearer edge 33' is less than half of the arcuate length of the concave arcuate bottom surface 14' of the bracket bottom flange 11, by at least 1° (shown in FIG. 6 as the angle b') to permit overhang of the attachment flange 12 over the base member 30 by an amount not greater than the attachment flange thickness t'. To achieve this, the small angle b' will range from 1° to that angle whose sine equals the thickness t' divided by the radius r'. Along the opposite edge 34' of the base member 30' there is an excess of arc length, designated c', at least as great as the angle whose sine equals t'/r. Considering the illustrations of FIGS. 1–5 inclusive, and the detailed explanation thereof, the similar utilization of this modified embodiment will be apparent.

While the present bracket and reversible base member assembly has been illustrated as used on welded fixtures consisting of tubes and welded-on angles for purpose of supporting a vertical contour board, it will be apparent that such uses are illustrative only. Accordingly the present invention is not to be construed narrowly but instead as co-extensive with the claims hereof.

I claim:
1. For use in overcoming misalignment of manufacturing fixtures wherein a moldboard or the like may be supported closely adjacent to such fixture and transverse to a plane surface on such fixture,
   a bracket and reversible base member assembly, comprising
      a rigid angle bracket having a bottom flange and a moldboard attachment flange meeting at a juncture edge,
      the bottom flange having a constant radius arcuate bottom surface, said juncture edge being perpendicular to the arc of said surface,
      the moldboard attachment flange having an outer face in a plane leading to said juncture edge and at a normal standard angle to a plane connecting the juncture edge with an opposite parallel edge of said bottom flange, in combination with
         a reversible base member having a base surface, whereby the assembly may be affixed to such surface of such a fixture, and having
            an arcuate seat surface, of the same said radius and of complementary curvature, terminating in parallel edges spaced farther apart than the width of the bracket bottom flange from its juncture edge to its opposite parallel edge,
            the parallel edges of the base member being of unequal height and at unequal distances from a plane perpendicular to both the base surface and the arc of the seat surface,
            the arc length of that part of the seat surface from such perpendicular plane to the less distant edge being less than half the arcuate length of the bottom flange of the bracket,
            whereby to provide an angular misalignment tolerance such that when said parts are assembled with said less distant edge at the side adjacent to the juncture edge of the bottom bracket flange, sideward sliding of the base member relative to the angle bracket will compensate for angular misalignment, within the range of such tolerance, without interference with such moldboard or the like, and
            whereby to provide, along the opposite edge of the base member, excess seat surface length so that greater misalignment may be compensated for by reversing the base member to position its opposite edge at the side adjacent to said juncture edge and trimming off to eliminate any resulting interference.

2. A bracket and reversible base member as defined in claim 1, in which the curvature of the bottom surface of the bracket bottom flange is convex.

3. A bracket and reversible base member as defined in claim 1, in which the curvature of the bottom surface of the bracket bottom flange is concave.

4. A bracket and reversible base member assembly as defined in claim 1, in which the difference between said arc length to the less distant edge of the seat surface and half the arcuate length of the bottom flange of the bracket, is within the range of from 1° to that angle whose sine equals the thickness of the moldboard attachment flange divided by the said radius.

References Cited

UNITED STATES PATENTS

| | | | |
|---|---|---|---|
| 1,987,726 | 1/1935 | Wilkerson et al. | 248—23 |
| 2,891,825 | 6/1959 | Barrett | 308—32 |
| 3,110,474 | 11/1963 | Circle | 308—135 XR |

ROY D. FRAZIER, *Primary Examiner.*

J. F. FOSS, *Assistant Examiner.*